United States Patent
Chen

(10) Patent No.: US 8,224,599 B2
(45) Date of Patent: Jul. 17, 2012

(54) SYSTEM AND METHOD FOR AUTOMATIC VOLTAGE RANGE MEASUREMENT

(75) Inventor: Cheng-Chi Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 436 days.

(21) Appl. No.: 12/549,377

(22) Filed: Aug. 28, 2009

(65) Prior Publication Data
US 2011/0015884 A1    Jan. 20, 2011

(30) Foreign Application Priority Data
Jul. 14, 2009 (CN) .......................... 2009 1 0304319

(51) Int. Cl.
G01R 19/00 (2006.01)
(52) U.S. Cl. .......................................................... 702/64
(58) Field of Classification Search ................... 702/64; 365/201, 200; 700/299
See application file for complete search history.

(56) References Cited

U.S. PATENT DOCUMENTS

| | | | | |
|---|---|---|---|---|
| 7,616,509 B2* | 11/2009 | Qureshi et al. | ................ | 365/201 |
| 8,095,246 B2* | 1/2012 | Chen | ............................ | 700/299 |
| 2009/0103379 A1* | 4/2009 | Zhang et al. | ................... | 365/200 |
| 2010/0208536 A1* | 8/2010 | Deng et al. | ..................... | 365/201 |

* cited by examiner

*Primary Examiner* — Drew A Dunn
*Assistant Examiner* — Xiuquin Sun
(74) *Attorney, Agent, or Firm* — Altis Law Group, Inc.

(57) ABSTRACT

A system for automatic voltage range measurement borne by an electronic device controls a voltage regulator module (VRM) of the electronic device to output a work voltage equaling a work voltage output by the VRM last time added to or subtracted by a voltage difference. When a determination module determines the electronic device has failed to power on or a test of the electronic device for testing hardware of the electronic device has failed after the electronic device is powered on at a work voltage, a limit value of a voltage range boned by the electronic device is ascertained. The limit value is equal to the work voltage this time subtracted or added by the voltage difference.

13 Claims, 5 Drawing Sheets

SYSTEM AND METHOD FOR AUTOMATIC VOLTAGE RANGE MEASUREMENT

BACKGROUND

1. Technical Field

The present disclosure relates to system measurement, and particularly to a system and a method for automatic voltage range measurement.

2. Description of Related Art

When a voltage range borne by a computer is measured, a resistance of a variable resistor connected to a voltage regulator module (VRM) of a motherboard of the computer needs to be manually adjusted, to change work voltages output by the VRM to ascertain the voltage range. However, such manual adjustment of resistance of the variable resistor can be inconvenient.

DETAILED DESCRIPTION

Figure 1:
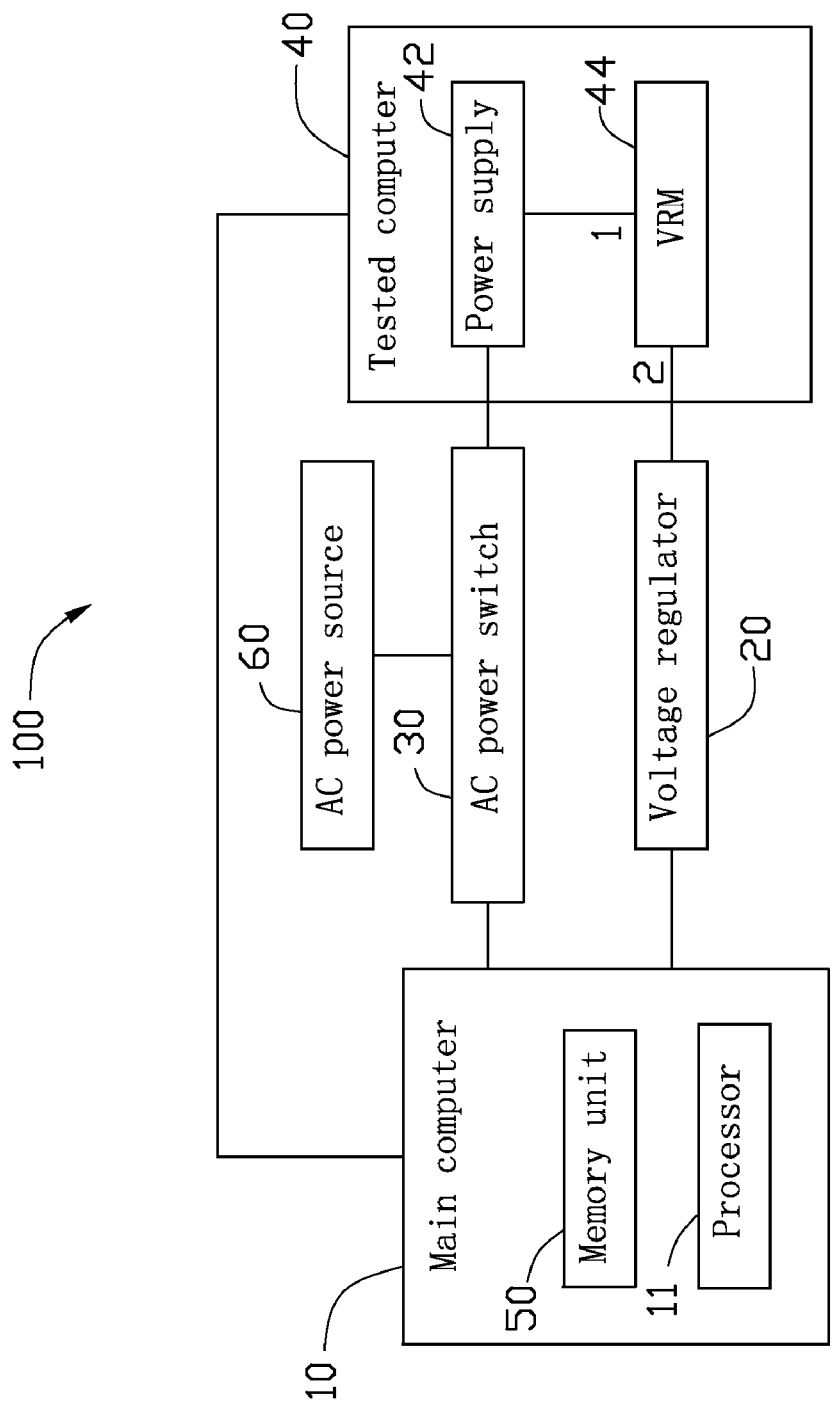
FIG. 1 is a block diagram of a system for automatic voltage range measurement, the system including a memory unit, in accordance with an embodiment.

Referring to FIG. 1, an exemplary embodiment of a system 100 of automatic voltage range measurement borne by an electronic device, such as a tested computer 40 having a voltage regulator module (VRM) 44 and a power supply 42 connected to an input terminal 1 of the VRM is illustrated. The system 100 includes a main computer 10 connected to the tested computer 40, a voltage regulator 20 connected between the main computer 10 and a reference terminal 2 of the VRM 44, and an alternating current (AC) power switch 30 connected between the main computer 10 and the power supply 42 of the tested computer 40. The AC power switch 30 is also connected to an AC power source 60. The main computer 10 includes a memory unit 50 and a processor 11 connected to the memory unit 50.

The memory unit 50 may include a random access memory (RAM) for temporary storage of information and/or a read only memory (ROM) for permanent storage of information.

Figure 2:
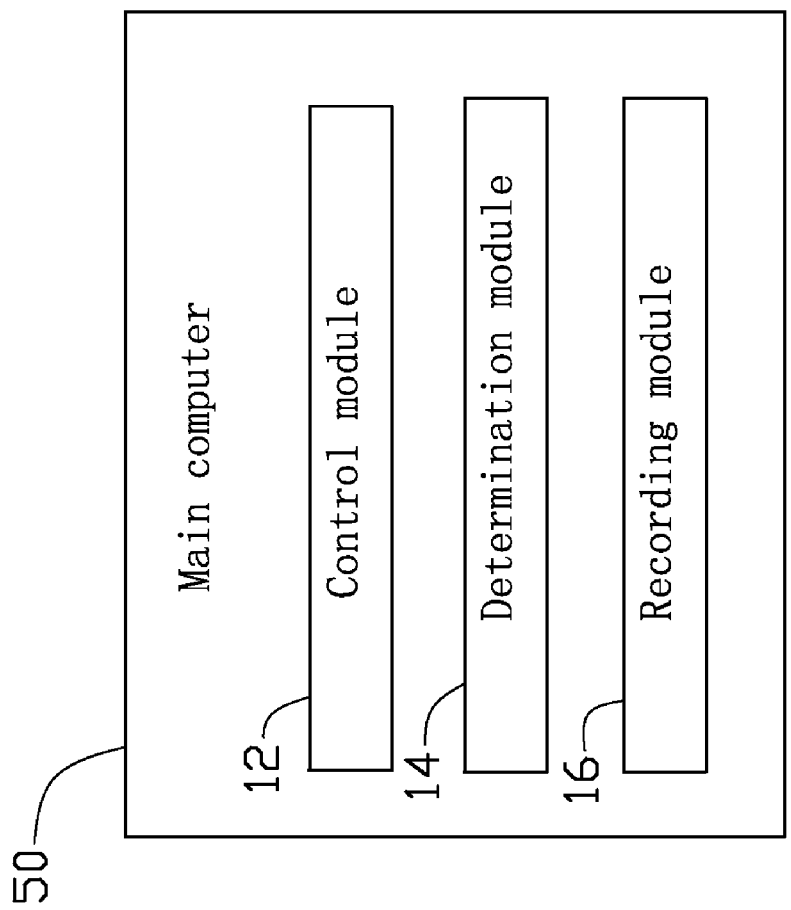
FIG. 2 is a block diagram of the memory unit of FIG. 1.
Figure 3A:
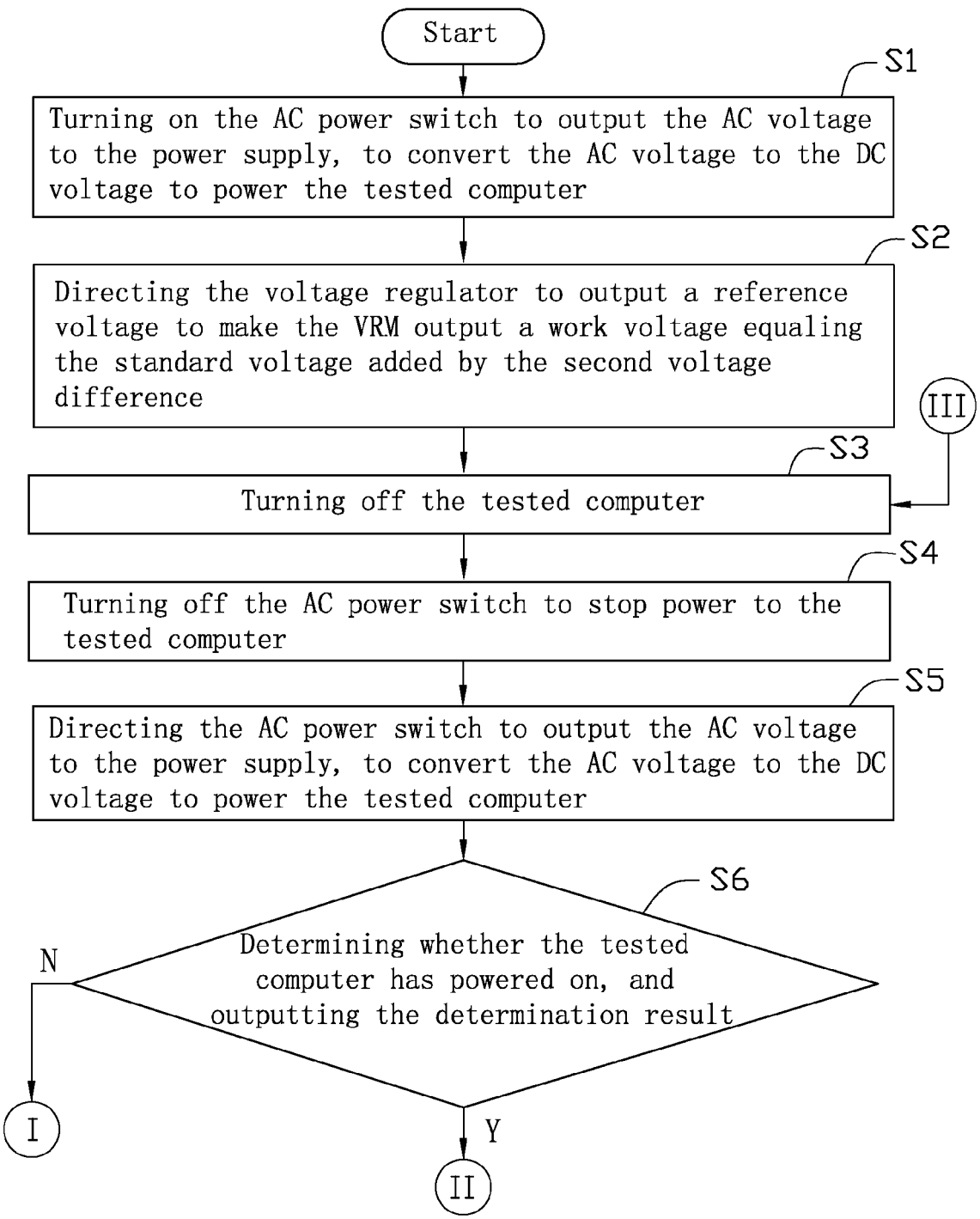
FIGS. 3A-3C are a flowchart illustrating a method for automatic voltage range measurement, in accordance with an embodiment.
Figure 3B:
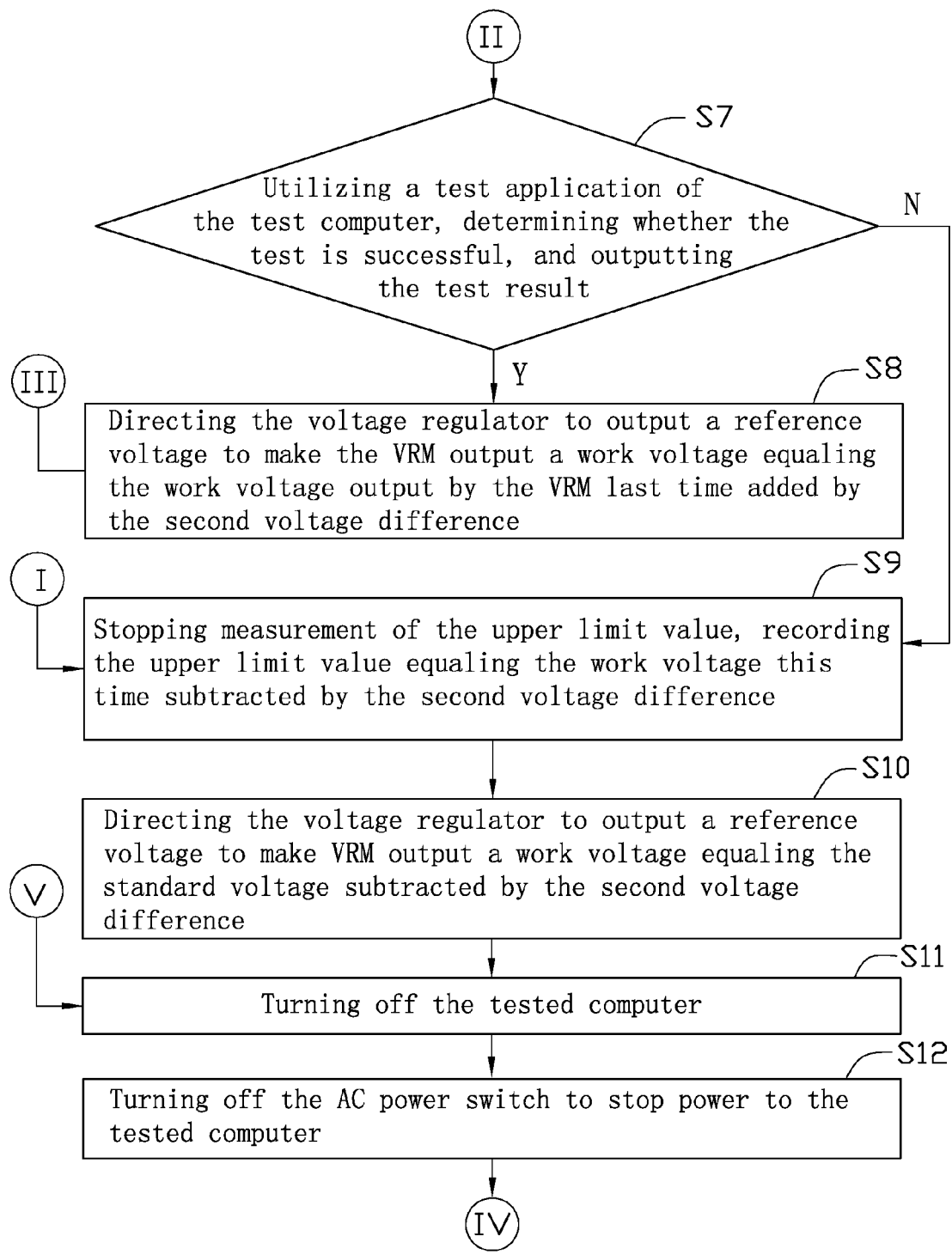
Figure 3C:
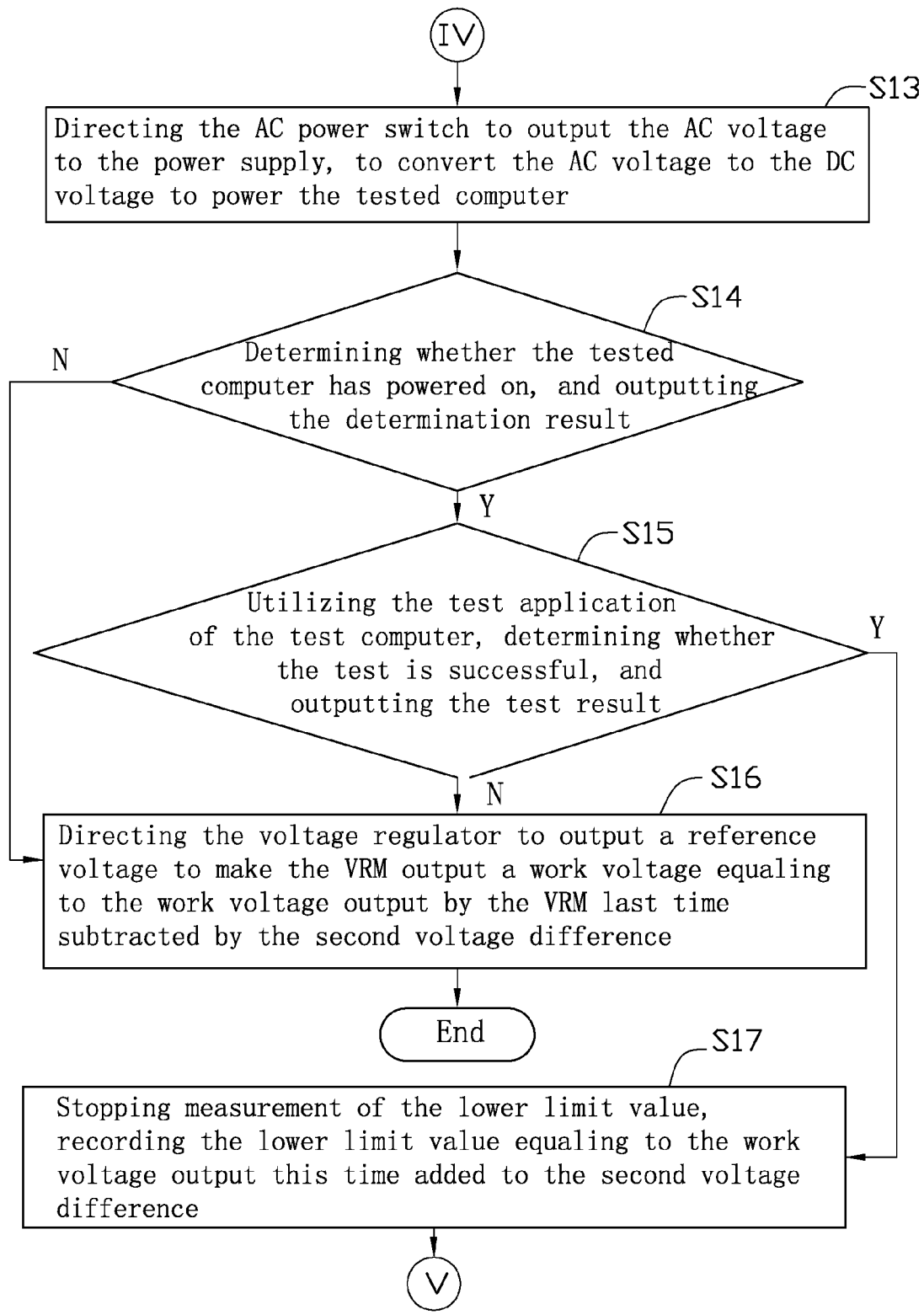

Referring to FIG. 2, the memory unit 50 includes a control module 12, a determination module 14, and a recording module 16. The control module 12, the determination module 14, and the recording module 16 may include one or more computerized instructions executable by the processor 10.

The control module 12 is operable to turn on the AC power switch 30 to output an AC voltage from the AC power source 60 to the power supply 42 of the tested computer 40.

The power supply 42 is operable to convert the received AC voltage to direct current (DC) voltage to power the tested computer 40.

The determination module 14 is operable to determine whether the tested computer 40 is powered on after the power supply 42 outputs the DC voltage to the tested computer 40 and the VRM 44 outputs a work voltage, and output a determination result denoting that the tested computer 40 is powered on or has failed to power on to the control module 12. If the tested computer 40 is powered on, the tested computer 40 executes a test application to test hardware of the tested computer 40, such as the central processing unit, the memory, the compact disc read-only memory, and so on.

The determination module 14 is also operable to determine whether the test is successful after the tested computer 40 performs the test application, and output a test result denoting that the test is successful or failed to the control module 12.

The control module 12 is also operable to direct the voltage regulator 20 to output a reference voltage to the reference terminal 2 of the VRM 44 after receiving the determination result denoting that the tested computer 40 is powered on and the test result denoting that the test is successful. The VRM 44 outputs the work voltage equaling the work voltage output by the VRM last time added by a voltage difference, hereinafter called second voltage difference, according to the received reference voltage.

When the reference voltage received by the reference terminal 2 of the VRM 44 is subtracted by a voltage difference, hereinafter called first voltage difference, the work voltage output by the VRM 44 is added by a second voltage difference. When the reference voltage received by the reference terminal 2 of the VRM 44 is added by a first voltage difference, the work voltage output by the VRM 44 is subtracted by a second voltage difference. The first voltage difference and the second voltage difference are positive values.

When an upper limit value of the voltage range is measured, the control module 12 directs the voltage regulator 20 to output a reference voltage for the first time to the reference terminal 2 of the VRM 44. The VRM 44 outputs the work voltage equaling a standard voltage added by a second voltage difference for the first time. The control module 12 then directs the voltage regulator 20 to output a reference voltage equaling the reference voltage output by the voltage regulator last time subtracted by a first voltage difference for every time after the first time. Therefore, the VRM 44 outputs a work voltage equaling the work voltage output by the VRM 44 last time added by a second voltage difference for every time after the first time. If the control module 12 receives the determination result denoting that the tested computer 40 has failed to power on or the test result denoting that the test has failed, the system 100 stops measurement of the upper limit value of the voltage range borne by the tested computer 40. The upper limit value of the voltage range is equal to the work voltage leading to the tested computer 40 failing to power on or the test failing subtracted by a second voltage difference. The standard voltage is the voltage output by the VRM 44 when the control module 12 does not direct the voltage regulator 20 to output the reference voltage to the reference terminal 2 of the VRM 44.

When a lower limit value of the voltage range is measured, the control module 12 directs the voltage regulator 20 to output a reference voltage for the first time to the reference terminal 2 of the VRM 44. The VRM 44 outputs the work voltage equaling a standard voltage subtracted by a second voltage difference for the first time. The control module 12 then directs the voltage regulator 20 to output a reference voltage equaling the reference voltage output by the voltage regulator last time added by a first voltage difference for every time after the first time. Therefore, the VRM 44 outputs a work voltage equaling the work voltage output by the VRM 44 last time subtracted by a second voltage difference for every time after the first time. If the control module 12 receives the determination result denoting that the tested computer 40 has failed to power on or the test result denoting that the test has failed, the system 100 stops measurement of the lower limit value of the voltage range borne by the tested computer 40. The lower limit value of the voltage range is equal to the work voltage leading to the tested computer 40 failing to power on or the test fails added by a second voltage difference.

The recording module 16 is operable to record the measured upper limit value and the measured lower limit value.

The control module 12 is further operable to turn off the AC power switch 30 to stop supplying power to the tested computer 40 after the VRM 44 outputs a work voltage equaling the work voltage output by the VRM 44 last time added by or subtracted by a second voltage difference, to continue measurement of the voltage range and protect the tested computer 40.

In the embodiment, the first voltage difference is 0.1 volts (V). The second voltage difference is 0.1 V. In other embodiments, the first and second voltage differences can be set as other values or a negative value.

Referring to FIG. 2, in order to ensure the work voltage output by the VRM 44 to be unique which leading to the tested computer 40 failing to power on or the test failing, it is necessary to determine whether the tested computer 40 has a fault, as follows.

In step K1, the control module 12 turns on the AC power switch 30 to output the AC voltage from the AC power source 60 to the power supply 42, to convert the AC voltage to the DC voltage to power the tested computer 40.

In step K2, the determination module 14 determines whether the tested computer 40 is powered on, and outputs the determination result to the control module 12. If the control module 12 receives the determination result denoting that the tested computer 40 is powered on, step K3 is implemented. If the control module 12 receives the determination result denoting that the tested computer 40 fails to power on, or the tested computer 40 has a fault, the voltage range borne by the tested computer 40 cannot be measured.

In step K3, the control module 12 turns off the tested computer 40 and the AC power switch 30 to stop supplying power to the tested computer 40. The system for automatically measuring voltage can be proceeded.

If the tested computer 40 has no fault, steps K1-K3 can be omitted.

An exemplary embodiment of a method for automatically measuring the voltage range borne by the tested computer 40 includes the following steps.

In step S1, the control module 12 turns on the AC power switch 30 to output the AC voltage from the AC power source 60 to the power supply 42, to convert the AC voltage to the DC voltage to power the tested computer 40.

In step S2, the control module 12 directs the voltage regulator 20 to output a reference voltage to the reference terminals 2 of the VRM 44. The VRM 44 outputs a work voltage equaling the standard voltage added by a second voltage difference according to the received reference voltage.

In step S3, the control module 12 turns off the tested computer 40.

In step S4, the control module 12 turns off the AC power switch 30 to stop power to the tested computer 40.

In step S5, the control module 12 directs the AC power switch 30 to output the AC voltage to the power supply 42, to convert the AC voltage to the DC voltage to power the tested computer 40.

In step S6, the determination module 14 determines whether the tested computer 40 is powered on, and outputs the determination result to the control module 12. If the control module 12 receives the determination result denoting that the tested computer 40 is powered on, step S7 is implemented. If the control module 12 receives the determination result denoting that the tested computer 40 has failed to power on, step S9 is implemented.

In step S7, the tested computer 40 utilizes the testing application to assess the hardware of the tested computer 40, such as the CPU, the memory, and so on. The determination module 14 determines whether the test is successful, and outputs the test result to the control module 12. If the control module 12 receives the test result denoting that the test is successful, step S8 is implemented. If the control module 12 receives the test result denoting that the test has failed, step S9 is implemented.

In step S8, the control module 12 directs the voltage regulator 20 to output a reference voltage equaling the reference voltage output by the voltage regulator 20 last time subtracted by the first voltage difference from the reference terminal 2 of the VRM 44. The VRM 44 outputs a work voltage equaling the work voltage output by the VRM 44 last time added by the second voltage difference, step S3 is repeated.

In step S9, the system 100 stops measurement of the upper limit value of the voltage range borne by the tested computer 40. The recording module 16 records the upper limit value equaling the work voltage output by the voltage regulator 20 this time subtracted by the second voltage difference.

In step S10, the control module 12 directs the voltage regulator 20 to output a reference voltage to the reference terminals 2 of the VRM 44; the VRM 44 outputs a work voltage equaling the standard voltage subtracted by the second voltage difference according to the received reference voltage.

In step S11, the control module 12 turns off the tested computer 40.

In step S12, the control module 12 turns off the AC power switch 30 to stop power to the tested computer 40.

In step S13, the control module 12 directs the AC power switch 30 to output the AC voltage to the power supply 42, to convert the AC voltage into the DC voltage to power the tested computer 40.

In step S14, the determination module 14 determines whether the tested computer 40 has powered on, and outputs the determination result to the control module 12. If the control module 12 receives the determination result denoting that the tested power has powered on, step S15 is implemented. If the control module 12 receives the determination result denoting that the tested power has failed to power on, step S17 is implemented.

In step S15, the tested computer 40 utilizes a testing application to test the hardware of the tested computer 40, such as the CPU, the memory, and so on. The determination module 14 determines whether the test is successful, and outputs the test result to the control module 12. If the control module 12 receives the test result denoting that the test is successful, step S16 is implemented. If the control module 12 receives the test result denoting that the test has failed, step S17 is implemented.

In step S16, the control module 12 directs the voltage regulator 20 to output a reference voltage equaling the reference voltage output by the voltage regulator 20 last time added by the first voltage difference to the reference terminal of the VRM 44. The VRM 44 outputs a work voltage equaling the work voltage output by the VRM 44 last time subtracted by the second voltage difference, step S11 is repeated.

In step S17, the system 100 stops measurement of the lower limit value of the voltage range borne by the tested computer 40. The recording module 16 records the lower limit value equaling the work voltage output by the voltage regulator 20 this time added by the second voltage difference.

In other embodiments, the system 100 can measure the upper limit value or the lower limit value of the voltage range borne by the tested computer 40 according to need. If the system 100 measures only the upper limit value of the voltage range, steps S10-S17 can be omitted. If the system 100 measures only the upper limit value of the voltage range, steps S4-S10 can be omitted.

For example, a standard voltage is 5V. The control module 12 directs the voltage regulator 20 to output a reference voltage to the reference terminals 2 of the VRM 44 to direct the VRM 44 to output 5.01V voltage. The control module 12 turns off the tested computer 40 and stops power to the tested computer 40. The control module 12 turns on the AC power switch 30 to power the tested computer 40. The determination module 14 determines that the tested computer 40 has powered on. The tested computer 40 implements the test application. The determination module 14 determines that the test is successful. The control module 12 directs the voltage regulator 20 to output a reference voltage equaling the reference voltage output by the voltage regulator 20 last time subtracted by the first voltage difference to the reference terminal 2 of the VRM 44, directing the VRM 44 to output 5.02V voltage. The control module 12 turns off the tested computer 40 and stops power to the tested computer 40. The control module 12 turns on the AC power switch 30 to power the tested computer 40. The determination module 14 determines that the tested computer 40 has failed to power on. The system 100 stops measurement of the upper limit value of the voltage range borne by the tested computer 40. The recording module 16 records the upper limit value of 5.01 V. The system starts to measure the lower limit value of the voltage range borne by the tested computer 40. Measurement of the lower limit value of the voltage range borne by the tested computer 40 is the same as the process of measuring the upper limit value.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A system for automatic voltage range measurement borne by an electronic device, the system comprising:
   a voltage regulator to output a plurality of reference voltages, comprising a first voltage difference between every two consecutive reference voltages;
   a main computer connected to the voltage regulator and the electronic device, the main computer comprising:
      a processor; and
      a memory unit connected to the processor, and storing a plurality of modules each of which contains one or more computerized instructions to be executed by the processor, wherein the modules comprises:
         a determination module to determine whether the electronic device has powered on after the electronic device receives a work voltage output by a voltage regulator module (VRM) of the electronic device, and output a determination result denoting that the electronic device is powered on or has failed to power on, wherein if the electronic device has powered on, the electronic device implements a test application to test hardware of the electronic device, the determination module also determines whether the test is successful, and outputs a corresponding test result;
         a control module directing the voltage regulator to output one of the plurality of the reference voltages to the VRM to direct the VRM to output a work voltage, equaling a work voltage output by the VRM last time added or subtracted by a second voltage difference, after receiving the determination result denoting the electronic device has powered on and the test result denoting the test is successful; and turn off the electronic device after the VRM outputs the work voltage equaling the work voltage output by the VRM last time added or subtracted by the second voltage difference; and
         a recording module to record a voltage value, equaling the work voltage output by the VRM this time subtracted or added by a second voltage difference, as a limit value of a voltage range borne by the electronic device in response to the determination result denotes that the electronic device has failed to power on or the test result denotes that the test has failed.

2. The system of claim 1, further comprising:
   an alternating current (AC) power switch, wherein the control module is further used to turn on the AC power switch to output an AC voltage to a power supply of the electronic device, and to turn off the AC power switch to stop power to the electronic device after the VRM outputs a work voltage equaling the work output by the VRM last time added or subtracted by a second voltage difference.

3. The system of claim 1, wherein the first voltage difference and the second voltage difference is positive.

4. The system of claim 3, wherein the first voltage difference is 0.1V, the second voltage difference is 0.01V.

5. The system of claim 3, wherein when an upper limit value of the voltage range is measured, the control module directs the voltage regulator to output a reference voltage for the first time to the VRM, the VRM outputs the work voltage equaling a standard voltage added by the second voltage difference for the first time, the control module directs the voltage regulator to output a reference voltage equaling the reference voltage output by the voltage regulator last time subtracted by the first voltage difference for every time after the first time, the VRM outputs a work voltage equaling the work voltage output by the VRM last time added by the second voltage difference for every time after the first time; if the control module receives the determination result denoting that the electronic device fails to power on or the test result denoting that the test has failed, the system stops measurement of the upper limit value of the voltage range, the upper limit value of the voltage range is equal to the work voltage leading to the electronic device fails to power on or the test has failed subtracted by the second voltage difference, the standard voltage is the voltage output by the VRM when the control module dose not direct the voltage regulator to output the reference voltage to the VRM.

6. The system of claim 3, wherein when a lower limit value of the voltage range is measured, the control module directs the voltage regulator to output a reference voltage for the first time to the VRM, the VRM outputs the work voltage equaling a standard voltage subtracted by the second voltage difference for the first time, the control module directs the voltage regulator to output a reference voltage equaling the reference voltage output by the voltage regulator last time added by the first voltage difference for every time after the first time, the VRM outputs a work voltage equaling the work voltage output by the VRM last time subtracted by the second voltage difference for every time after the first time; and if the control module receives the determination result denoting that the electronic device has failed to power on or the test result denoting that the test has failed, the system stops measurement of the lower limit value of the voltage range, the lower limit value of the voltage range is equal to the work voltage leading to the electronic device fails to power on or the test has failed added by the second voltage difference, the standard voltage is the voltage output by the VRM when the control module does not direct the voltage regulator to output the reference voltage to the VRM.

7. A method for automatic measurement of voltage range borne by an electronic device, the method comprising:
- a: inputting a direct current (DC) voltage to the electronic device;
- b: directing a voltage regulator to output a reference voltage to a voltage regulator module (VRM) of the electronic device to direct the VRM to output a work voltage equaling a standard voltage added by a first voltage difference according to the reference voltage; wherein the standard voltage is a voltage output by the VRM when the voltage regulator is not controlled to output the reference voltage to the VRM;
- c: turning off the electronic device;
- d: supplying the DC voltage to the electronic device again;
- e: determining whether the electronic device has powered on, and outputting a determination result; if the determining result denotes that the electronic device is powered on, step f is implement; if the determination result denotes that the electronic device fails to power on, step h is implement;
- f: implementing a testing application, determining whether the test is successful, and outputting a test result; if the test result denotes that the test is successful, step g is implement; if the test result denotes that the test has failed, step h is implement;
- g: directing the voltage regulator to output a reference voltage equaling the reference voltage output by the voltage regulator last time subtracted by the second voltage difference to the VRM to direct the VRM to output a work voltage equaling the work voltage output by the VRM last time added by the first voltage difference, returning to step c;
- h: stopping measurement of a first limit value of the voltage range borne by the electronic device, and recording the first limit value equaling the work voltage output by the voltage regulator this time subtracted by the first voltage difference;
- i: directing the voltage regulator to output a reference voltage to the VRM to direct the VRM to output a work voltage equaling a standard voltage subtracted by a first voltage difference according to the reference voltage;
- j: turning off the electronic device again;
- k: supplying the DC voltage to the electronic device;
- l: determining whether the electronic device is powered on, and outputting a determination result; if the determination result denotes that the electronic device has powered on, step m is implement; if the determination result denotes that the electronic device has failed to power on, step o is implement;
- m: implementing a testing application, determining whether the test is successful, and outputting a test result; if the test result denotes that the test is successful, step n is implement; if the test result denotes that the test has failed, step o is implement;
- n: directing the voltage regulator to output a reference voltage equaling the reference voltage output by the voltage regulator last time added to the second voltage difference to the VRM to direct the VRM to output a work voltage equaling the work voltage output by the VRM last time subtracted from the first voltage difference, returning to step j; and
- o: stopping measurement of a second limit value of the voltage range borne by the electronic device, and recording the second limit value equaling the work voltage output by the voltage regulator this time added by the first voltage difference.

8. The method of claim 7, wherein the first voltage difference and the second voltage difference are positive value.

9. The method of claim 8, wherein the first limit value is an upper limit value of the voltage range, the second limit value is a lower limit value of the voltage range.

10. The method of claim 7, wherein the first voltage difference is 0.01V, and the second voltage difference is 0.1V.

11. A method for automatically measuring a limit value of a voltage range borne by an electronic device, the method comprising:
- a: inputting a direct current (DC) voltage to the electronic device;
- b: directing a voltage regulator to output a reference voltage to a voltage regulator module (VRM) of the electronic device to direct the VRM to output a work voltage equaling a standard voltage added by a first voltage difference according to the reference voltage; wherein the standard voltage is a voltage output by the VRM when the voltage regulator is not controlled to output the reference voltage to the VRM;
- c: turning off the electronic device;
- d: supplying the DC voltage to the electronic device;
- e: determining whether the electronic device is powered on, and outputting a determination result; if the determination result denotes that the electronic device has powered on, step f is implement; if the determination result denotes that the electronic device has failed to power on, step h is implement;
- f: implementing the testing application, determining whether the test is successful, and outputting a test result; if the test result denotes that the test is successful, step g is implement; if the test result denotes that the test has failed, step h is implement;
- g: directing the voltage regulator to output a reference voltage equaling the reference voltage output by the voltage regulator last time subtracted by the second voltage difference to the VRM to direct the VRM to output a work voltage equaling the work voltage output by the VRM last time added by the first voltage difference, returning to step c;
- h: stopping measurement of the limit value of the voltage range borne by the electronic device, and recording the limit value equaling the work voltage output by the voltage regulator this time subtracted by the first voltage difference.

12. The method of claim 11, wherein the first voltage difference and the second voltage difference is positive value, the limit value is an upper limit value of the voltage range.

13. The method of claim 11, wherein the first voltage difference and the second voltage difference is negative value, the limit value is a lower limit value of the voltage range.

* * * * *